June 2, 1970   J. M. C. DRYON   3,515,020
APPARATUS FOR SCORING SHEET GLASS
Filed March 4, 1968   4 Sheets-Sheet 1

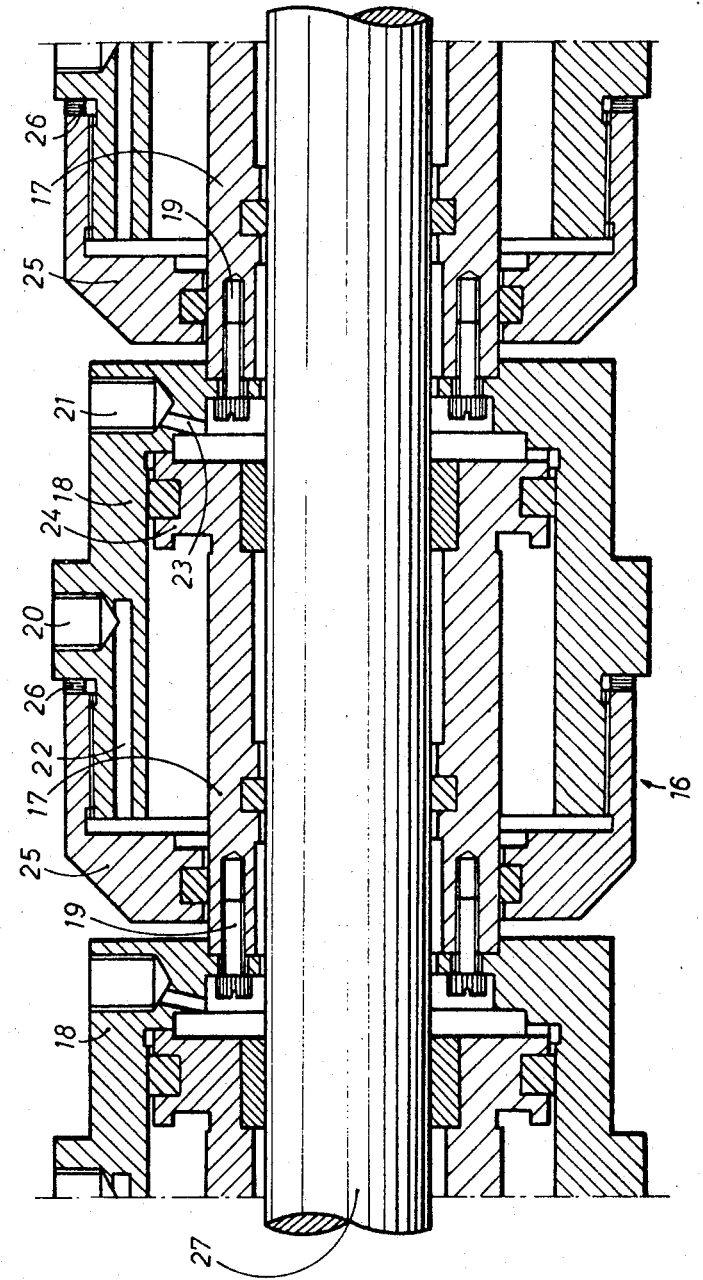

United States Patent Office 3,515,020
Patented June 2, 1970

3,515,020
APPARATUS FOR SCORING SHEET GLASS
Jacques Max Charles Dryon, Auvelais, Belgium, assignor to Ateliers Heuze, Malevez et Simon Reunis Societe Anonyme, Auvelais, Belgium, a company of Belgium
Filed Mar. 4, 1968, Ser. No. 710,225
Claims priority, application Belgium, May 24, 1967, 44,059
Int. Cl. B26d 3/08
U.S. Cl. 83—11
5 Claims

ABSTRACT OF THE DISCLOSURE

Apparatus for scoring sheets of glass conveyed through a breaking station on a horizontal transporter, comprises a girder arranged parallel to the transporter and adapted for transverse displacement above the sheet of glass for scoring the same by means of tools distributed over the entire length of the girder each mounted on a carriage capable of limited longitudinal displacement on the girder in a zone corresponding to a fraction of the length of the girder, each carriage being displaced by a set of screw jacks which are axially juxtaposed and have a maximum predetermined stroke length such that by the actuation of selected combination of jacks the associated carriage is caused to bring the tool exactly to the desired point of its zone, the zones of the different carriages overlapping each other at their extremities.

---

The invention relates to an apparatus for scoring sheets of glass which are to be conveyed to a breaking station by means of a horizontal transporter.

According to a well-known process, the strip of glass is cut into large sheets which are subsequently checked for faults by one or more qualified operators who mark all the faults so observed. These sheets then have to be cut into smaller, faultless pieces. This cutting operation is carried out by scoring first of all the sheet transversely relative to its direction of travel and then breaking it along the scored line. Each of the pieces is then deflected in a perpendicular direction where it is scored and subsequently broken longitudinally relative to the direction of travel prior to scoring. Since shape and position of the faults in the sheet can vary infinitely, it is necessary, in order to have as little wastage as possible, to carry out the scoring in the greatest possible number of zones in the sheet. Moreover, the time allocated for the scoring operation is very brief and, in addition, all parallel scoring in a given sheet has to be carried out simultaneously, as far as possible.

In general, the scoring devices are provided either with movable tools solely along an axis perpendicular to the plane of the glass sheet, and in a large number so as to offer numerous possibilities for positioning the cutting lines, or with tools movable both along an axis perpendicular to the plane of a sheet and along an axis parallel to the longitudinal edge thereof, so as to enable said tools to operate in a large number of zones.

In the last-mentioned case, the scoring devices advantageously comprise a beam arranged parallel to the transporter and capable of moving transversely above a sheet of glass to score the latter by means of tools appropriately distributed along the length of the beam. Each of these tools is mounted on a carriage which can execute a limited longitudinal displacement in zones corresponding to a fraction of the beam length.

According to the invention, the movement of each of these carriages is controlled by a screw jack set, said jacks being juxtaposed and having predetermined maximum ranges of movement, so that by the operation of a selected combination of jacks the carriage is able to bring the tool exactly to a desired point of its zone of action, the zones of action of the different carriages overlapping at their extremities.

The jacks of a given set are guided by one or more bars attached to the beam at their extremities. Preferably, the different jacks of a set are treaded onto an axial guide bar. The free end of a jack rod is then attached to the body of the following jack and the body of the first jack is wedged in the guide bar, while the rod of the last jack is connected to the carriage. The various jacks can be arranged for operation either by a pressure fluid or by an electro-magnetic means.

Each jack comprises an element for effecting the precision setting of the movement of its rod. Advantageously, this element is a ring of calibrated thickness, which is interposed between the bottom of the jack body and the head of the jack which are screwed together.

The scoring apparatus may comprise a keyboard to enable the operator to select the combination of jacks to be actuated for each carriage, but preferably the apparatus is combined with an electronic data processor capable of setting up the cutting sequence for a sheet of glass according to the demand and the previously detected faults, and of selecting for each carriage the combination of jacks to be actuated, which allows the positioning of the tools to be effected within a very brief time interval, and also makes possible effecting scoring of the sheet in a single movement of the beam from one edge to the other.

The invention will now be described in greater detail with reference to the attached drawing, wherein:

FIG. 1 schematically illustrates a scoring beam, provided with several tools displaceable thereon;

FIG. 4 is an axial section of a jack assembled with the adjacent jacks.

Figure 1:
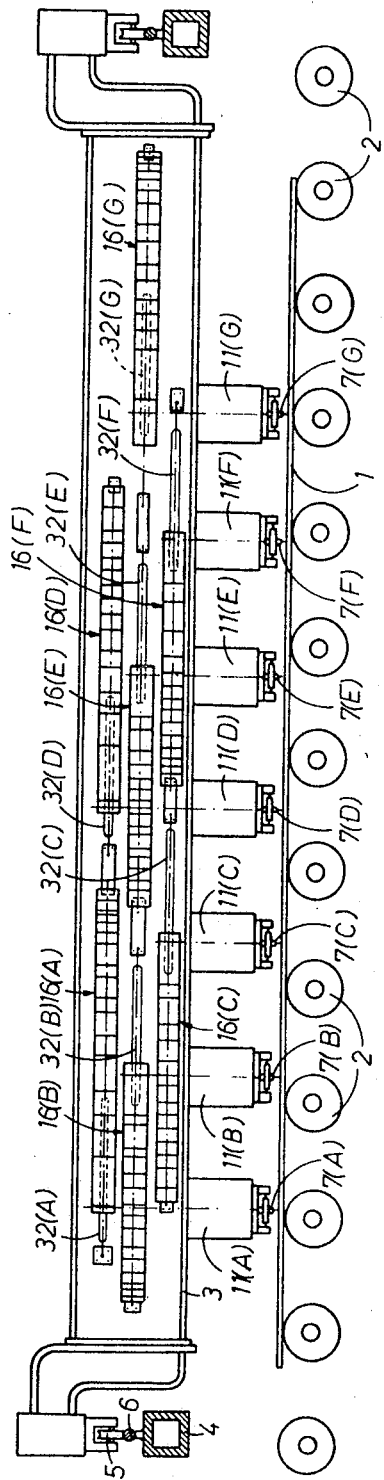

A sheet of glass 1 is conveyed to the scoring station and removed therefrom by a conveyor, schematically illustrated as a roller train 2 (FIG. 1). The scoring station comprises a beam or girder 3 arranged parallel to the conveyor and supported at its extremities by fixed beams 4, over sheaves 5 on a roller track 6, so as to enable the beam to move transversely from one edge of the sheet 1 to the other, entraining all the scoring tools 7. The latter are distributed over the entire length of the beam and each of said tools can execute on the beam a limited longitudinal displacement, so that the sheet can be scored at any desired point.

Figure 2:
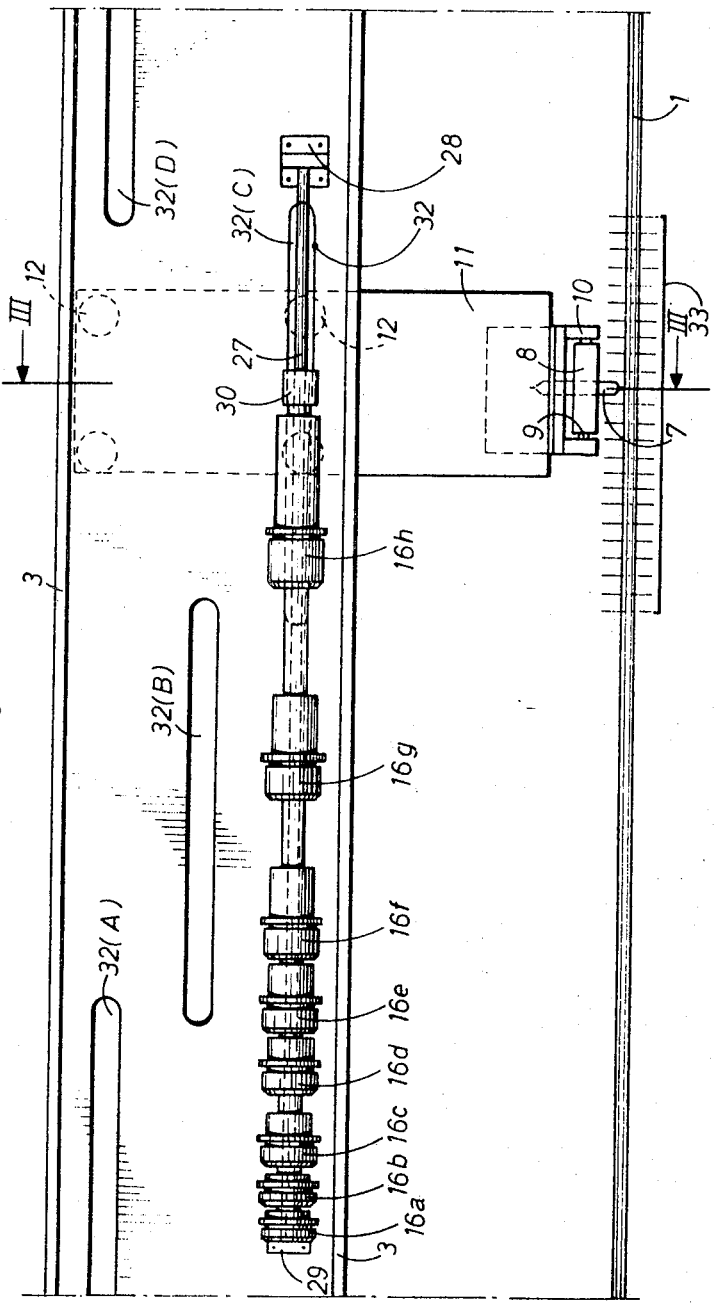
FIG. 2 illustrates on an enlarged scale a part of the beam and a single tool for scoring with its drive.
Figure 3:
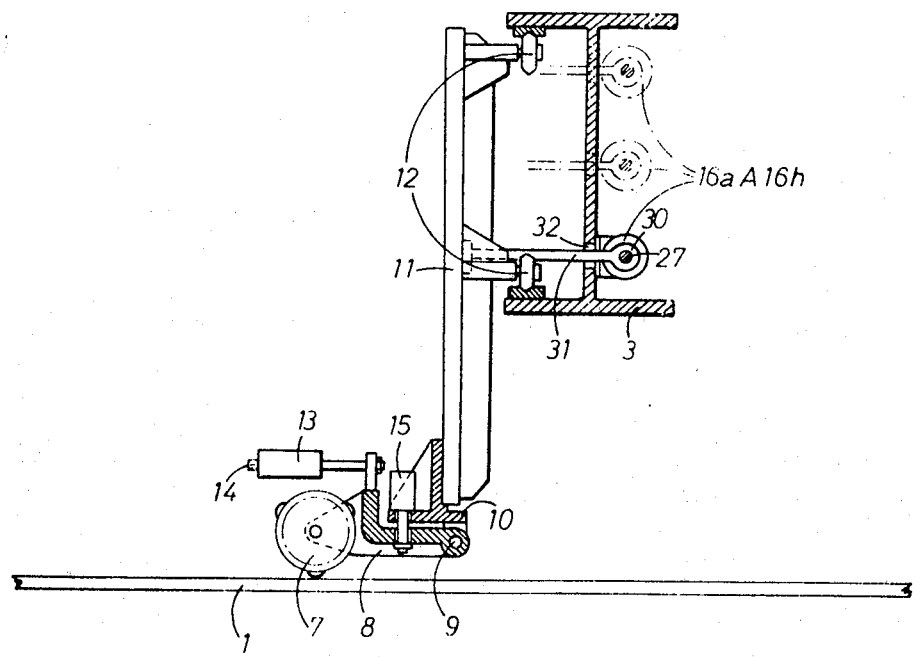
FIG. 3 is a section taken along the line III—III of FIG. 2.

The tools are mounted on tool holders 8 (FIGS. 2 and 3), which are articulated at 9 to the supports 10, each of the latter being made fast to a carriage 11 capable of moving on the beam by means of rollers 12 during the positioning of the tool. During the scoring operation, the tools are applied to the sheet of glass by means of a counterweight 13 (FIG. 3) acting on an arm 14 of the tool holder 8. The raising of the tools during their positioning or during the scoring operation is effected with the aid of an electro-magnet 15.

According to the invention, the displacement of the carriages 11 for positioning of the tools 7 is effected by sets of score jacks 16. The various jacks, e.g. 16a–16h of a set are axially juxtaposed and their rods 17 are fixed to the bottom 18 of the following jacks with the aid of screws 19 (FIG. 4). The jacks can be actuated only to run their full course, and in a set of jacks the course of each jack is exactly determined and allocated, so as to enable the carriage and its tool to be brought to the desired scoring position by actuating a selected combination of jacks.

The jacks are arranged for actuation either by means of a fluid or by electromagnets. FIG. 4 shows by way of example pneumatically operated jacks, in which the bottom portion 18 of the jack body is provided with threaded joints 20 and 21 connecting the jack to flexible gas conduits and communicating with the interior of the jack by conduits 22 and 23 on either side of a piston 24 fast with the rod 17. A part of the head 25 is screwed to the bottom portion 18 of each jack. The piston 24 abuts either against the bottom part 18 or against the head part 25. The exact stroke of the piston is determined by a ring 26 of calibrated thickness which is interposed between the parts 18 and 25.

The jacks of each set are guided by a bar, in the present case by an axial bar 27, which is fixed at 28 and 29 (FIG. 2) to the web of the girder 3. The jacks are threaded on this bar 27 and the body of the first jack 16a is keyed to the bar, while the other jacks are slidable on the bar and the extremity of the stem of the last jack, in this case of the jack 16h, carries a fixed collar 30, fast with an arm 31 (FIG. 3), which is rigidly connected to the carriage 11. The arm 31 traverses the web of the girder through an elongated aperture 32. The length of this aperture corresponds to the sum of the strokes of the jacks of a given set, and consequently also to the area of a zone 33 in which the carriage can be displaced and stopped at any point where the tool 7 has to produce a scored line.

As already stated, the sheets of glass are conveyed to the scoring station after observation of their defects and after establishing a cutting program for each sheet. This program includes the combination of the jacks for each scoring tool which is to be rendered operative. If the positioning of the tools is carried out by hand, the actuation of the jacks of the various combinations selected can be carried out with the aid of a keyboard, comprising for each tool a number of keys corresponding to the number of jacks in each set of jacks. In the example of embodiment herein described, the keyboard would accordingly have 7 rows of 8 keys each, which the operator would have to actuate according to a previously prepared program, which would require very little time.

On the other hand, if the program for cutting the sheets of glass is set up with the aid of an electronic data processing unit, capable of selecting among several manufacturing programs that one which will operate with the least amount of wastage, the task of the electronic data processor is extended to the selection of the combination of jacks of each set and the actuation of the jacks included in the combinations thus selected.

The invention is of course not limited to the form of embodiment herein described by way of example, and can be modified in various ways without thereby exceeding the scope of the invention.

I claim:

1. An apparatus for scoring sheets of glass to be conveyed through a breaking station on a horizontal transporter, said apparatus comprising a girder arranged parallel to the transporter and adapted for transverse displacement above a sheet of glass, tools distributed over the entire length of said girder for scoring the sheet of glass, a carriage supporting each tool and capable of limited longitudinal displacement on the girder in a zone corresponding to a fraction of the length of the girder, and a set of screw jacks which are axially juxtaposed and have a maximum predetermined stroke length engaged with each carriage to displace the same such that by the actuation of a selected combination of jacks the associated carriage is enabled to bring the tool exactly into the desired point of its zone, the zones of the different carriages overlapping each other at their extremities.

2. An apparatus according to claim 1 comprising at least one bar fixed to said girder and guiding the jacks of a given set of jacks.

3. An apparatus according to claim 2 wherein each jack of a set includes a body and a jack rod with a free extremity fixed to the body of the next following jack, the body of the first jack being keyed on said bar while the rod of the last jack in a set is connected to the carriage.

4. An apparatus according to claim 1 comprising means in each jack for adjusting the stroke of the rod thereof.

5. An apparatus according to claim 4 wherein said jacks each include a body and a head threadably engaged together and said means for adjusting the stroke comprises a ring of calibrated thickness which is located between the bottom of the body of the jack and the head of the jack.

References Cited

UNITED STATES PATENTS 3,424,357  1/1969  Curtze et al. _____ 225—2

JAMES M. MEISTER, Primary Examiner

U.S. Cl. X.R.

83—700; 225—96.5